March 19, 1963 T. A. KESEL ETAL 3,081,532
FLEXIBLE STRIP INSTALLATION DEVICE
Filed Feb. 4, 1960
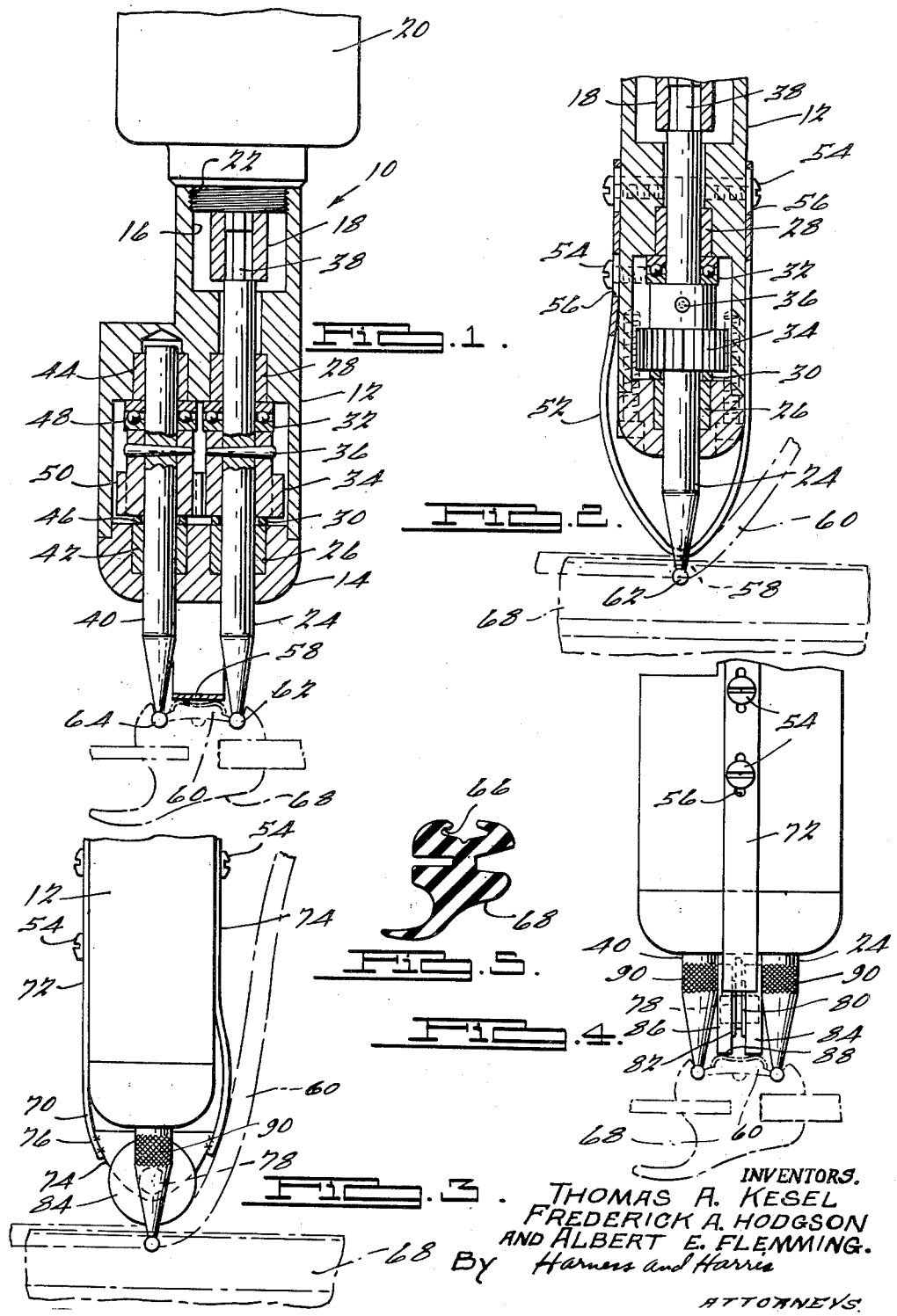
INVENTORS.
THOMAS A. KESEL
FREDERICK A. HODGSON
AND ALBERT E. FLEMMING.
By Harness and Harris
ATTORNEYS.

United States Patent Office 3,081,532
Patented Mar. 19, 1963

3,081,532
FLEXIBLE STRIP INSTALLATION DEVICE
Thomas A. Kesel, Farmington, Frederick A. Hodgson, Detroit, and Albert E. Flemming, Birmingham, Mich., assignors to Chrysler Corporation, Highland Park, Mich., a corporation of Delaware
Filed Feb. 4, 1960, Ser. No. 6,806
2 Claims. (Cl. 29—235)

This invention relates to a device for installing flexible strips of material into channels in a flexible base wherein the channels must be spread apart by the device to allow insertion of the strip therein.

In automotive vehicles and other structures which utilize flexible weatherstripping, the problem is encountered of inserting expansion strips into a face of the weatherstripping to force portions of the weatherstripping tightly against portions of the structure, such as the window edges and frame edges in windshield installations. The conventional method of inserting this expansion strip into the weatherstripping is to manually spread apart the channel in the weatherstripping provided therefor and forcing the expansion strip therein. This manual operation is time-consuming and very often, due to inaccurateness of manual operations, the expansion strip is not suitably inserted in place with resultant leakage past the weatherstripping.

A principal object of this invention is to provide a device or tool which is power-operated and which automatically spreads the channel in the weatherstripping apart and inserts therein the flexible expansion strip in a rapid and efficient manner.

Further objects and advantages of the present invention will become apparent from the following description and drawings in which:

FIGURE 1 represents a cross-sectional view of the device;

FIGURE 2 represents a cross-sectional view of the device of FIGURE 1 showing one of the spreading members in elevation;

FIGURE 3 represents a side view of a variation of the device of FIGURES 1 and 2;

FIGURE 4 represents a front view of the device of FIGURE 3; and

FIGURE 5 represents a cross-sectional view of a typical weatherstripping.

Referring to the drawings, and in particular FIGURES 1 and 2, the expansion strip inserting device generally designated 10 comprises a body 12 provided with an end cap 14 and a socket 16 on the opposite end of the device for receiving a driving shaft 18 of a power means such as an air motor 20, the housing of which may be threaded into the socket 16 as shown at 22.

A first channel spreading member or roller 24 is rotatably supported in body 12 by means of roller bearings or bushings 26 and 28 and thrust bearings 30 and 32. A gear 34 is locked to the member 24 by a pin 36 which may be threaded or force fitted. The upper end of shaft or member 24 is provided with flat portions 38 which are received in the end of driving shaft 18 in a complementary or keying fashion so that rotation of driving shaft 18 will also rotate shaft 24.

A second roller or spreading member 40 is supported in housing or body 12 by bearings 42, 44, 46, and 48 in the same manner as shaft 24 is supported. Roller 40 is similarly provided with a gear 50 which meshes with gear 34 and imparts rotation to roller 40 in an opposite direction to the rotation of roller 24.

An expansion strip guiding means 52 is adjustably secured to body 12 by screws 54 threaded into the body 12 and extending through adjusting slots 56 in the guiding means or member 52. Member 52 has a smooth and substantially flat guiding surface 58 which extends between the spreading members 24 and 40 and forms therewith a channel shaped space for the reception of an expansion or flexible strip 60.

As shown in FIGURE 1 in particular, the spreading members 24 and 40 are provided with spherical tips 62 and 64 respectively and these tips being rotated in opposite directions when once inserted into the groove 66 in the weatherstripping 68 will tend to spread this groove or channel 66 apart to allow sufficient space for the insertion therein of the expansion strip 60. The direction of rotation of rollers 24 and 40 is so chosen as to automatically move the entire device 10 along the groove 66 in a direction which will allow the guiding surface 58 of member 52 to force expansion strip 60 into the groove 66.

With reference to FIGURE 2 the direction of movement of the device 10 would be to the right and the rotation of member 24, as viewed from the top, would be clockwise. It is noted that the spherical shape of tips 62 and 64 allow substantial frictional engagement with the sides of the channel forming groove 66 to allow rotation of members 24 and 40 to move device 10 along the channel while at the same time preventing excessive frictional engagement of the bottom motor portion of the tips tending to inhibit the natural movement of the device 10 along said groove 66.

Referring to FIGURES 3 and 4, the guiding means 52 of FIGURES 1 and 2 is replaced by a guiding means 70 comprising a pair of adjustable members 72 and 74 on opposite sides of body 12 and supporting a bearing or wheel support 74 by means of welds 76 or other suitable means. Support 74 comprises a shaft 78 pressed into the support and a pair of washer bearings 80 and 82 on opposite sides of the support. A pair of wheels 84 and 86 are rotatably mounted on shaft 78 and adapted to roll along the top 88 of the expansion strip 60 in such a manner as to diminish significantly the frictional engagement of this guiding means with the expansion strip. To facilitate transfer of power from members 24 and 40 to wheels 84 and 86, knurled portions 90 may be provided on each of the members 24 and 40 which knurled portions engage said wheels adjacent their peripheries.

It is to be expected that variations in the drive structure and gearing of the devices disclosed could be readily made by one skilled in the art without deviating from the scope of the present invention, and it is not applicants' intention to be limited to the exact construction shown in this application.

We claim:

1. A flexible strip installing tool comprising spaced spreading means mounted on a body for rotation in opposite directions, said spreading means being adapted for connection to and operation by a power device, said spreading means having ends adapted to engage opposed sides of a channel member to drive themselves therealong, substantially spherical tips on the channel engaging ends of said spreading means to enhance the frictional engagement of said spreading means with the sides of said channel member while reducing the frictional engagement with the bottom of said channel member, and strip guiding means supported between said spreading means to substantially define a channel for the accommodation of a flexible expansion strip.

2. A flexible strip installing tool comprising: a housing having a pair of spaced channel spreading means mounted thereon for power driven rotation in opposite directions, said spreading means being adapted to engage opposed side walls of a channel to thereby drive themselves therealong and spread said channel; power driving means operatively engaging said spreading means; and strip guiding means comprising a pair of rollers coaxially mounted for independent rotation between said spreading means and operatively engaged by said spreading means.

References Cited in the file of this patent

UNITED STATES PATENTS

| | | |
|---|---|---|
| 2,160,336 | Maxfield | May 30, 1939 |
| 2,533,367 | Gruszecki | Dec. 12, 1950 |
| 2,638,131 | Rohs | May 12, 1953 |
| 2,707,852 | Fillweber | May 10, 1955 |
| 2,761,199 | Allen | Sept. 4, 1956 |

FOREIGN PATENTS

| | | |
|---|---|---|
| 88,425 | Netherlands | June 16, 1958 |